Patented Mar. 17, 1925.

1,530,164

UNITED STATES PATENT OFFICE.

PHILIP SCHIDROWITZ AND MERVYN STANLEY STUTCHBURY, OF LONDON, ENGLAND.

MANUFACTURE OF RUBBER.

No Drawing.   Application filed March 26, 1924. Serial No. 702,104.

*To all whom it may concern:*

Be it known that PHILIP SCHIDROWITZ and MERVYN STANLEY STUTCHBURY, both subjects of the King of Great Britain, and both residing at London, England, have invented certain new and useful Improvements in and Relating to the Manufacture of Rubber, of which the following is a specification.

This invention relates to improvements in and relating to the manufacture of vulcanized rubber.

It is known that by spraying rubber latex into a gaseous drying medium, crude rubber can be obtained, which contains substantially all the solid constituents of the original latex, but so far as we are aware it has never been proposed to treat a colloidal suspension or emulsion of vulcanized rubber in an aqueous medium e. g. latex, in which the crude rubber has been converted into vulcanized rubber without coagulation taking place, by spraying said vulcanized rubber latex into a gaseous drying medium, in such a way that all the particles are immediately dried, and vulcanized rubber is obtained, the reason being that it was only recently that one of the present applicants succeeded in producing such vulcanized latex.

In the specification of United States Letters Patent No. 1,443,149 a process for producing a colloidal suspension or emulsion of vulcanized rubber in an aqueous medium has been described and claimed according to which for example, rubber latex is submitted to vulcanization with sulphur or other vulcanizing agents under such conditions as to preclude coagulation, or any substantial coagulation of the rubber during vulcanization.

We have now found that by treating vulcanized latex produced by the process described and claimed in the specification of said Letters Patent No. 1,443,149, for example according to one of the processes and apparatus described and claimed in the specification of United States Patent No. 1,166,225 or No. 1,213,887 remarkable products are obtained inasmuch as the dried particles of vulcanized latex contain not only all the solid constituents of the original latex, but the finished product produced is dry vulcanized rubber which is ready for treatment by any well known process such as compressing, sheeting, moulding, forcing or extruding and the like, operations which cannot be carried out with ordinary vulcanized rubber.

We have found that in contradistinction to ordinary vulcanized rubber, the product obtained by this new process, although fully vulcanized, remains in a plastic condition for some time, and this condition can be retained for a considerable time if the product is kept in air tight receptacles. The material can thus be used for many purposes for which ordinary vulcanized rubber is not suitable. An additional advantage which is of technical importance is that the vulcanized rubber retains its plasticity for some time so that fillers, for example colloidal clay, carbon black, dyes, pigments, fibres and the like can be incorporated therewith in a rubber mill or other apparatus used in the art, which cannot be done with ordinary vulcanized rubber.

Suitable filling materials and/or dyes and the like may of course be added to the vulcanized latex prior to its being sprayed.

Instead of spraying the vulcanized latex to substantially complete dryness, it is possible, and for certain purposes of advantage, to conduct the operations in such a manner as to leave any suitable amounts of liquid in the sprayed product.

It is obvious that any known apparatus or processes for drying solutions or emulsions by spraying may be used, now we have established by the present invention, that it is possible to produce vulcanized rubber with special properties in a dry or concentrated form by spraying vulcanized latex into a gaseous drying medium under such conditions that substantially all the solid constituents of the original colloidal suspension or emulsion of vulcanized latex can be obtained without interfering with the inherent natural qualities of vulcanized rubber.

We claim:—

1. The process for the production of dry vulcanized rubber having special plastic properties and endowed with the natural qualities inherent in unmilled vulcanized rubber, which comprises obtaining substantially all the solid constituents from a colloidal suspension or emulsion of vulcanized rubber in an aqueous medium by finely comminuting said suspension or emulsion into a gaseous drying medium.

2. The process for the production of dry vulcanized rubber having special plastic properties and endowed with the natural qualities inherent in unmilled vulcanized rubber, which comprises obtaining substantially all the solid constituents from a colloidal suspension or emulsion of vulcanized rubber in an aqueous medium by finely comminuting said suspension or emulsion into a gaseous drying medium, and thereupon submitting the dry vulcanized rubber to mechanical treatment.

3. The process for the production of dry vulcanized rubber having special plastic properties and endowed with the natural qualities inherent in unmilled vulcanized rubber which comprises obtaining substantially all the solid constituents from a colloidal suspension or emulsion of vulcanized rubber in an aqueous medium by finely comminuting said suspension or emulsion into a gaseous drying medium and thereupon incorporating admixtures with said dry vulcanized rubber.

4. The process for the production of dry vulcanized rubber having special plastic properties and endowed with the natural qualities inherent in unmilled vulcanized rubber which comprises obtaining substantially all the solid constituents from a mixture of a colloidal suspension or emulsion of vulcanized rubber in an aqueous medium and additional substances by finely comminuting said mixture into a gaseous drying medium.

5. The process for the production of dry vulcanized rubber having special plastic properties and endowed with the natural qualities inherent in unmilled vulcanized rubber which comprises obtaining substantially all the solid constituents from a colloidal suspension or emulsion of vulcanized rubber in an aqueous medium by finely comminuting said suspension or emulsion into a gaseous drying medium, thereupon incorporating admixtures with said dry vulcanized rubber and submitting the product thus obtained to mechanical treatment.

6. The process for the production of dry vulcanized rubber having special plastic properties and endowed with the natural qualities inherent in unmilled vulcanized rubber which comprises obtaining substantially all the solid constituents from a mixture of a colloidal suspension or emulsion of vulcanized rubber in an aqueous medium and additional substances by finely comminuting said mixture into a gaseous drying medium and thereupon submitting the dry product thus obtained to mechanical treatment.

7. The process for the production of vulcanized rubber containing any suitable proportion of liquid and having special plastic properties and endowed with the natural qualities inherent in unmilled vulcanized rubber, which comprises obtaining substantially all the solid constituents from a colloidal suspension or emulsion of vulcanized rubber in an aqueous medium by finely comminuting said suspension or emulsion into a gaseous drying medium.

8. The process for the production of vulcanized rubber containing any suitable proportion of liquid and having special plastic properties and endowed with the natural qualities inherent in unmilled vulcanized rubber, which comprises obtaining substantially all the solid constituents from a colloidal suspension or emulsion of vulcanized rubber in an aqueous medium by finely comminuting said suspension or emulsion into a gaseous drying medium, and thereupon submitting the vulcanized rubber obtained to mechanical treatment.

9. The process for the production of vulcanized rubber containing any suitable proportion of liquid and having special plastic properties and endowed with the natural qualities inherent in unmilled vulcanized rubber, which comprises obtaining substantially all the solid constituents from a colloidal suspension or emulsion of vulcanized rubber in an aqueous medium by finely comminuting said suspension or emulsion into a gaseous drying medium and thereupon incorporating admixtures with said vulcanized rubber.

10. The process for the production of vulcanized rubber containing any suitable proportion of liquid and having special plastic properties and endowed with the natural qualities inherent in unmilled vulcanized rubber, which comprises obtaining substantially all the solid constituents from a mixture of a colloidal suspension or emulsion of vulcanized rubber in an aqueous medium and additional substances by finely comminuting said mixture into a gaseous drying medium.

11. The process for the production of vulcanized rubber containing any suitable proportion of liquid and having special plastic properties and endowed with the natural qualities inherent in unmilled vulcanized rubber, which comprises obtaining substantially all the solid constituents from a colloidal suspension or emulsion of vulcanized rubber in an aqueous medium by finely comminuting said suspension or emulsion into a gaseous drying medium, thereupon incorporating admixtures with said vulcanized rubber and submitting the product thus obtained to mechanical treatment.

12. The process for the production of vulcanized rubber containing any suitable proportion of liquid and having special plastic properties and endowed with the natural qualities inherent in unmilled vulcanized rubber, which comprises obtaining substantially all the solid constituents from a mixture of a colloidal suspension or emulsion of vulcanized rubber in an aqueous medium and additional substances by finely comminuting said mixture into a gaseous drying medium and thereupon submitting the product thus obtained to mechanical treatment.

In testimony whereof we affix our signatures.

PHILIP SCHIDROWITZ.
MERVYN STUTCHBURY.